US012602924B2

(12) United States Patent
Shoeb et al.

(10) Patent No.: US 12,602,924 B2
(45) Date of Patent: Apr. 14, 2026

(54) METHOD FOR SEMANTIC LOCALIZATION OF AN UNMANNED AERIAL VEHICLE

(71) Applicant: Wing Aviation LLC, Mountain View, CA (US)

(72) Inventors: Ali Shoeb, San Rafael, CA (US); Kyle Kakligian, San Francisco, CA (US); Damien Jourdan, Colomiers (FR); Michael Zhong, New York, NY (US); Ke Xu, Newark, CA (US); Jeremie Gabor, Mountain View, CA (US)

(73) Assignee: Wing Aviation LLC, Palo Alto, CA (US)

( * ) Notice: Subject to any disclaimer, the term of this patent is extended or adjusted under 35 U.S.C. 154(b) by 892 days.

(21) Appl. No.: 17/710,516

(22) Filed: Mar. 31, 2022

(65) Prior Publication Data

US 2023/0316741 A1 Oct. 5, 2023

(51) Int. Cl.
*G06V 20/17* (2022.01)
*G01C 21/00* (2006.01)
(Continued)

(52) U.S. Cl.
CPC ........... *G06V 20/17* (2022.01); *G01C 21/005* (2013.01); *G01C 21/3881* (2020.08);
(Continued)

(58) Field of Classification Search
CPC ........ G06V 20/17; G06V 20/13; G06V 20/64; G06V 30/422; G06F 19/2155;
(Continued)

(56) References Cited

U.S. PATENT DOCUMENTS

| | | | | |
|---|---|---|---|---|
| 2010/0017114 A1* | 1/2010 | Tehan | ................... | G01C 21/20 |
| | | | | 701/423 |
| 2013/0223750 A1* | 8/2013 | Xiong | ................. | G06V 10/751 |
| | | | | 382/218 |

(Continued)

FOREIGN PATENT DOCUMENTS

| | | | | |
|---|---|---|---|---|
| CN | 107796374 B | 9/2020 | | |
| CN | 113077551 A | * 7/2021 | ............. | G06T 17/20 |
| WO | WO2021013400 A1 | 1/2021 | | |

OTHER PUBLICATIONS

Ahmed Nassar, A Deep CNN-Based Framework for Enhanced Aerial Imagery Registration with Applications to UAV Geolocalization, Jun. 18-22, 2018 (Year: 2018).*
(Continued)

*Primary Examiner* — Andrew W Bee
*Assistant Examiner* — Caleb L Esquino
(74) *Attorney, Agent, or Firm* — McDonnell Boehnen Hulbert & Berghoff LLP

(57) ABSTRACT

A computer-implemented method comprises receiving an image captured by a camera on an unmanned aerial vehicle (UAV). The image depicts an environment below the UAV. A feature mask associated with the image is generated via a machine learning model that is trained to identify and semantically label pixels representing the environment depicted in the image. One or more reference tiles associated with the environment are retrieved. The reference tiles are associated with particular geographic locations and specify semantically labeled pixels representing the geographic locations. The semantically labeled pixels of the feature mask are correlated with the semantically labeled pixels of at least one of the one or more reference tiles to determine the geographic location of the UAV in the environment.

17 Claims, 17 Drawing Sheets

(51) Int. Cl.
    *G06N 20/00*     (2019.01)
    *G06T 7/73*     (2017.01)
    *G06V 20/00*     (2022.01)

(52) U.S. Cl.
    CPC ............... *G06N 20/00* (2019.01); *G06T 7/74*
    (2017.01); *G06V 20/00* (2022.01)

(58) Field of Classification Search
    CPC ..................... G01C 11/00; G01S 13/89; G06T
        2207/10032; G06T 7/70–77; G05D
        1/0274
    See application file for complete search history.

(56)             References Cited

U.S. PATENT DOCUMENTS

| | | | | |
|---|---|---|---|---|
| 2014/0336925 | A1* | 11/2014 | Akin | G09G 5/363 |
| | | | | 701/457 |
| 2015/0170526 | A1 | 6/2015 | Wang et al. | |
| 2017/0328716 | A1* | 11/2017 | Ma | G06F 18/241 |
| 2018/0188045 | A1* | 7/2018 | Wheeler | G06V 10/98 |
| 2018/0199025 | A1* | 7/2018 | Holzer | G05D 1/652 |
| 2018/0218533 | A1* | 8/2018 | Millin | G06T 17/05 |
| 2018/0232900 | A1* | 8/2018 | Kraft | G06V 10/255 |
| 2019/0011934 | A1* | 1/2019 | DeBitetto | G05D 1/102 |
| 2019/0197292 | A1 | 6/2019 | Abeywardena et al. | |
| 2020/0034646 | A1* | 1/2020 | Ding | G06V 20/176 |
| 2020/0258400 | A1 | 8/2020 | Yuan et al. | |
| 2021/0133997 | A1 | 5/2021 | Abeywardena | |
| 2022/0057213 | A1* | 2/2022 | Singhal | G06T 7/74 |

OTHER PUBLICATIONS

Arzhang Shahbazi, "Learning-based Localization of Mobile Users for Throughput Maximization in UAV Networks", 2021 (Year: 2021).*

Jouko Kinnari, "LSVL: Large-scale season-invariant visual localization for UAVs", Dec. 2022 (Year: 2022).*

Koppány Máthé et al., "Vision and Control for UAVs: A Survey of General Methods and of Inexpensive Platforms for Infrastructure Inspection", Published Jun. 25, 2015.

* cited by examiner

500

600

605 RECEIVE IMAGE

610 GENERATE FEATURE MASK ASSOCIATED WITH IMAGE

615 ADJUST ORIENTATION AND/OR SCALE OF FEATURE MASK

620 RECEIVE AND COMBINE REFERENCE TILES

625 CORRELATE FEATURE MASK WITH COMBINED REFENCE TILES

630 UPDATE PROBABILITY GRID

635 PROBABILITY GRID VALID

NO

YES

640 OUPUT LOCATION PREDICTION

700

705B

705C

700

705A

705D

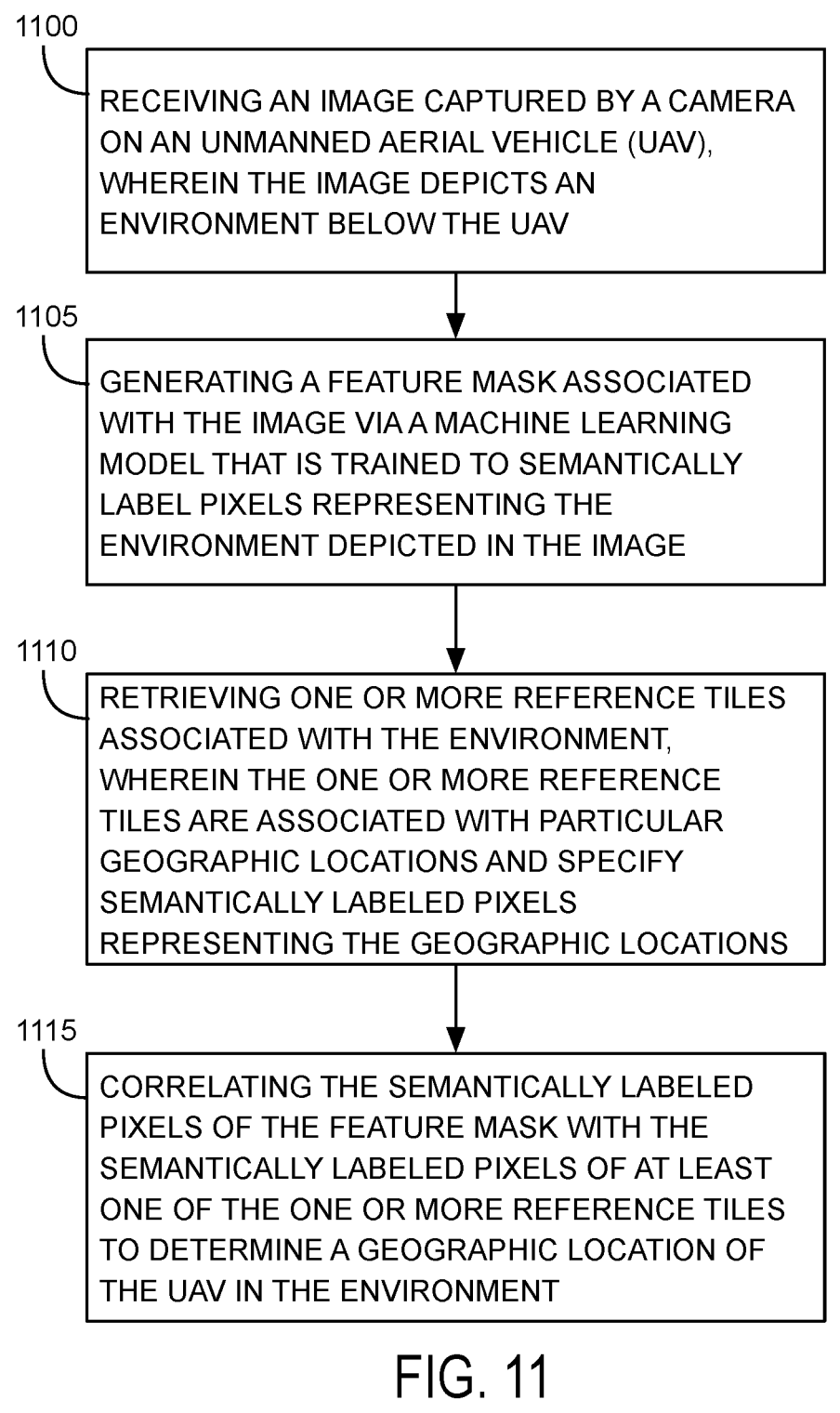

1100

RECEIVING AN IMAGE CAPTURED BY A CAMERA ON AN UNMANNED AERIAL VEHICLE (UAV), WHEREIN THE IMAGE DEPICTS AN ENVIRONMENT BELOW THE UAV

1105

GENERATING A FEATURE MASK ASSOCIATED WITH THE IMAGE VIA A MACHINE LEARNING MODEL THAT IS TRAINED TO SEMANTICALLY LABEL PIXELS REPRESENTING THE ENVIRONMENT DEPICTED IN THE IMAGE

1110

RETRIEVING ONE OR MORE REFERENCE TILES ASSOCIATED WITH THE ENVIRONMENT, WHEREIN THE ONE OR MORE REFERENCE TILES ARE ASSOCIATED WITH PARTICULAR GEOGRAPHIC LOCATIONS AND SPECIFY SEMANTICALLY LABELED PIXELS REPRESENTING THE GEOGRAPHIC LOCATIONS

1115

CORRELATING THE SEMANTICALLY LABELED PIXELS OF THE FEATURE MASK WITH THE SEMANTICALLY LABELED PIXELS OF AT LEAST ONE OF THE ONE OR MORE REFERENCE TILES TO DETERMINE A GEOGRAPHIC LOCATION OF THE UAV IN THE ENVIRONMENT

FIG. 11

METHOD FOR SEMANTIC LOCALIZATION OF AN UNMANNED AERIAL VEHICLE

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Disclosed herein are various examples of UAVs and various support systems that cooperate to facilitate determining the location of a UAV based on images captured by a camera of the UAV. In some examples, these operations are invoked when Global Navigation Satellite System (GNSS) signals cannot be received by the UAV, rendering GNSS-based location determination impossible.

In a first aspect, a computer-implemented method comprises receiving an image captured by a camera on an unmanned aerial vehicle (UAV). The image depicts an environment below the UAV. A feature mask associated with the image is generated via a machine learning model that is trained to identify and semantically label pixels representing the environment depicted in the image. One or more reference tiles associated with the environment are retrieved. The reference tiles are associated with particular geographic locations and specify semantically labeled pixels representing the geographic locations. The semantically labeled pixels of the feature mask are correlated with the semantically labeled pixels of at least one of the one or more reference tiles to determine the geographic location of the UAV in the environment.

In a second aspect, an unmanned aerial vehicle (UAV) comprises a camera and a control system. The control system is configured to perform operations comprising receiving an image captured by the camera. The image depicts an environment below the UAV. The control system generates a feature mask associated with the image via a machine learning model that is trained to identify and semantically label pixels representing the environment depicted in the image. The control system retrieves one or more reference tiles associated with the environment. The reference tiles are associated with particular geographic locations and specify semantically labeled pixels representing the geographic locations. The control system correlates the semantically labeled pixels of the feature mask with the semantically labeled pixels of at least one of the one or more reference tiles to determine the geographic location of the UAV in the environment.

In a third aspect, a non-transitory computer-readable medium comprises program instructions executable by one or more processors to perform operations comprising receiving an image captured by a camera on an unmanned aerial vehicle (UAV). The image depicts an environment below the UAV. A feature mask associated with the image is generated via a machine learning model that is trained to identify and semantically label pixels representing the environment depicted in the image. One or more reference tiles associated with the environment are retrieved. The reference tiles are associated with particular geographic locations and specify semantically labeled pixels representing the geographic locations. The semantically labeled pixels of the feature mask are correlated with the semantically labeled pixels of at least one of the one or more reference tiles to determine the geographic location of the UAV in the environment.

These, as well as other aspects, advantages, and alternatives, will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 11 illustrates operations performed by one or more devices described herein, in accordance with example embodiments.

DETAILED DESCRIPTION

Figure 1A:
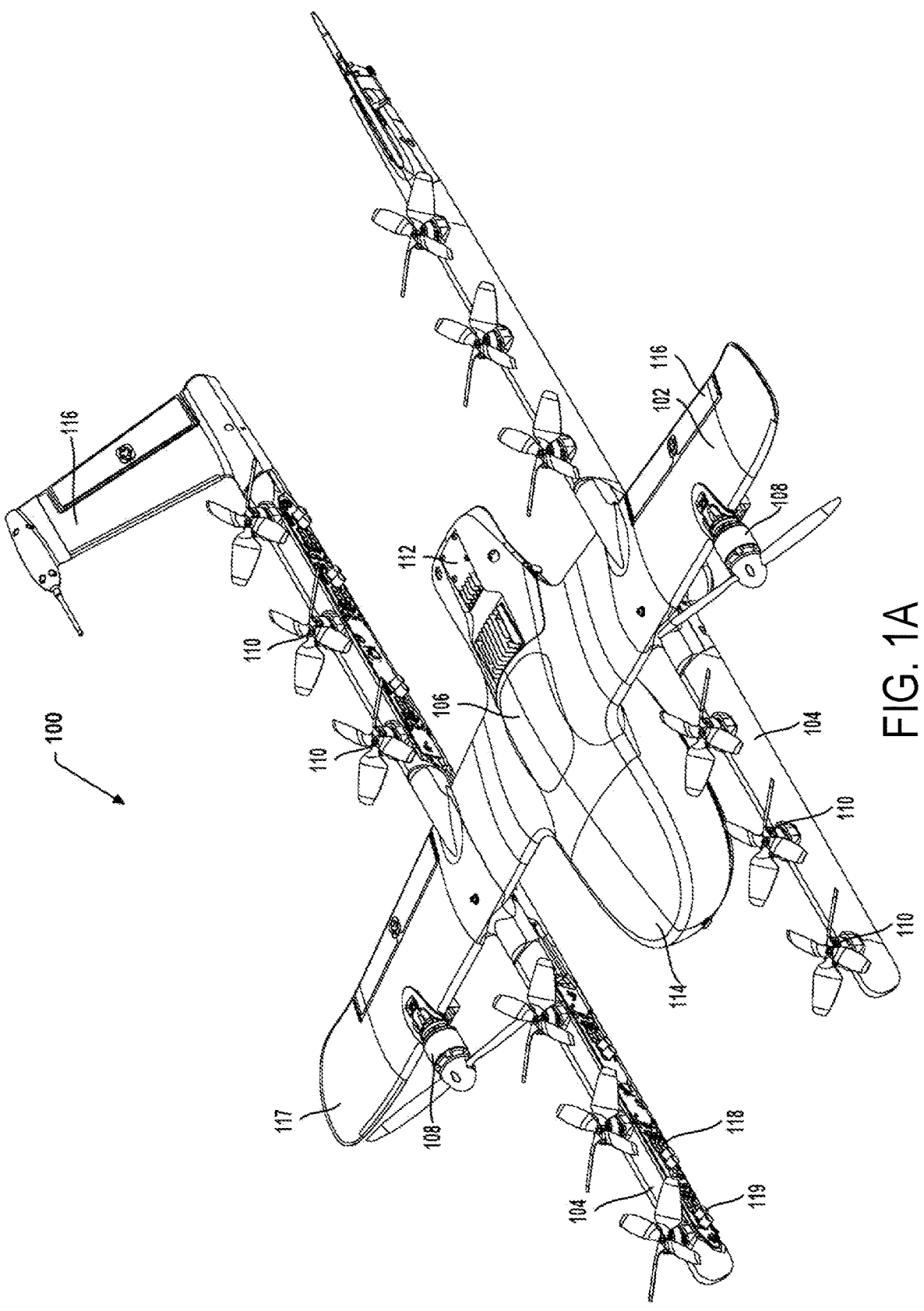
FIG. 1A is a simplified illustration of an unmanned aerial vehicle, according to example embodiments, in accordance with example embodiments.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

Disclosed herein are various examples of UAVs and various support systems that cooperate to facilitate determining the location of a UAV based on images captured by a camera of the UAV. In some examples, these operations are invoked when Global Navigation Satellite System (GNSS) signals cannot be received by the UAV, rendering GNSS-based location determination impossible.

More specifically, examples described herein involve semantic localization in the form of a camera-based, real-time algorithm running onboard the aircraft that uses the semantic content of images to provide an absolute positioning estimate. As the aircraft performs its mission, images may be passed through a semantic segmentation model which attempts to label every pixel in an image as belonging to a set of classes. This labeled image may then be compared to a set of geolocated semantically labeled reference images. Since the pixels in the reference images are geolocated, an estimate of the aircraft's position can be derived from matching classes in the image captured by the UAV to those in the reference images.

In some examples described herein, the UAV is configured to generate a feature mask associated with a captured image. In some examples, the feature mask is generated via a machine learning model that is trained to identify and semantically label pixels representing the environment depicted in the image (e.g., label as structures, foliage, roads, driveways, etc.). In some examples, the feature mask is generated based at least in part on feature mask information (e.g., magnetic anomaly maps) communicated from other sources (e.g., a ground control station). In some examples, the feature mask information is derived from other sensors of the UAV or sensors of different UAVs.

Some examples of the UAV retrieve reference tiles associated with the environment. The reference tiles are associated with particular geographic locations and specify semantically labeled pixels representing the geographic locations. The UAV correlates the semantically labeled pixels of the feature mask with the semantically labeled pixels of the reference tiles to determine the geographic location of the UAV in the environment.

In some examples, the heading associated with the feature mask is aligned to match the heading associated with reference tiles. For instance, the feature mask and the reference tiles may both be North-aligned. In some examples, the feature mask is resized to have a scale that matches the scale associated with the reference tiles.

In some examples, the retrieved reference tiles are combined, and the features of the feature mask are aligned with a portion of the combined reference tiles to determine the location of the UAV in the environment. In this regard, in some examples, a likelihood grid associated with the combined reference tiles is generated. The likelihood grid indicates relative likelihoods that the location of the UAV is at particular locations of the combined reference tiles.

Further, in some examples, a cumulative likelihood grid is generated based on a plurality of likelihood grids associated with a corresponding plurality of images successively captured as the UAV moves through the environment. The cumulative likelihood grid combines information from multiple likelihood grids to more accurately indicate relative likelihoods that the location of the UAV is at particular locations of the combined reference tiles. When the relative likelihood associated with a particular location of the combined reference tiles exceeds a threshold likelihood, the geographic location of the UAV may be determined based at least in part on the particular location. In further examples, a validity check on a determined location of the UAV may be performed by evaluating one or more probability diameters in the cumulative likelihood grid to ensure sufficient confidence in a potential location of the UAV.

II. EXAMPLE UNMANNED VEHICLES

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100.

In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
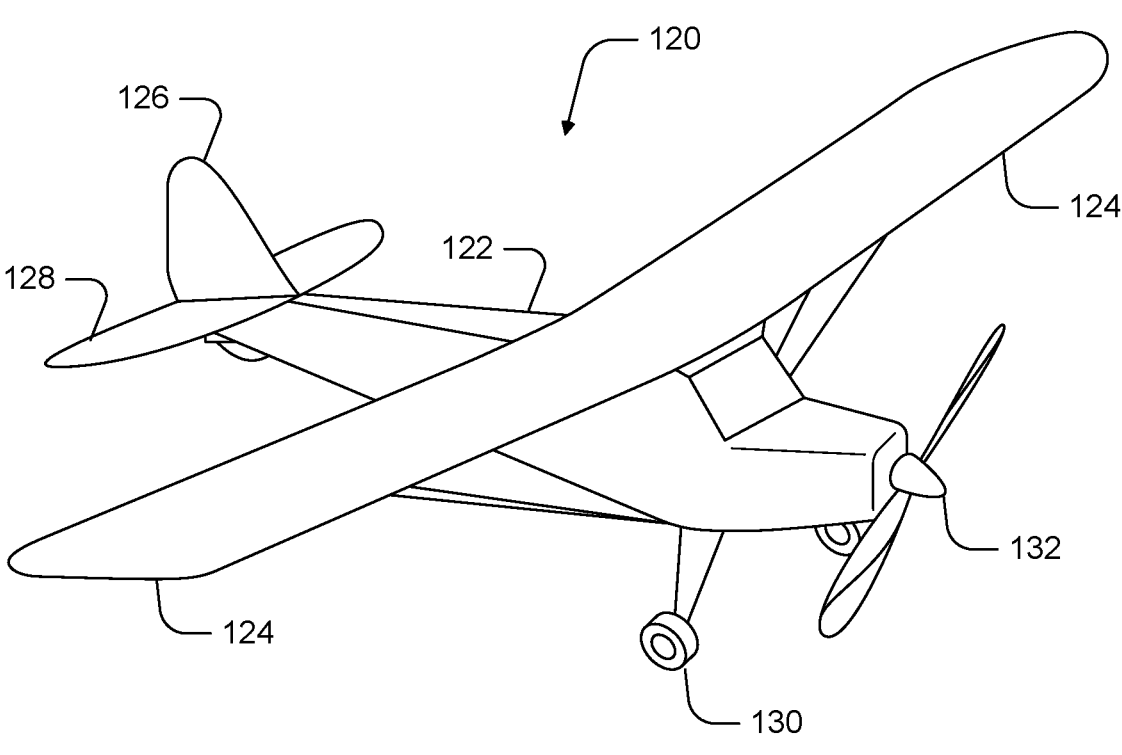
FIG. 1B is a simplified illustration of an unmanned aerial vehicle, according to example embodiments, in accordance with example embodiments.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
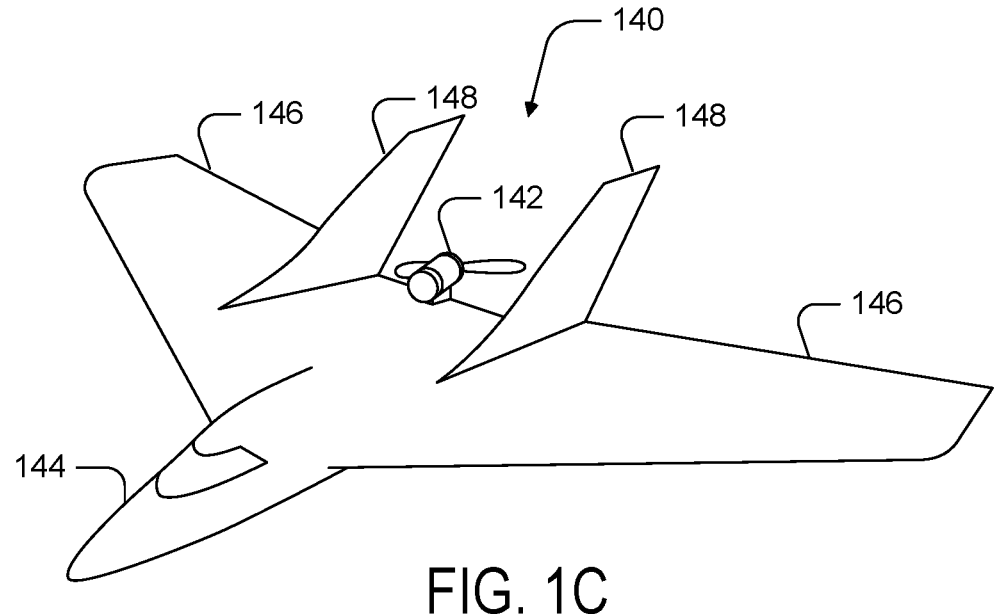
FIG. 1C is a simplified illustration of an unmanned aerial vehicle, according to example embodiments, in accordance with example embodiments.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
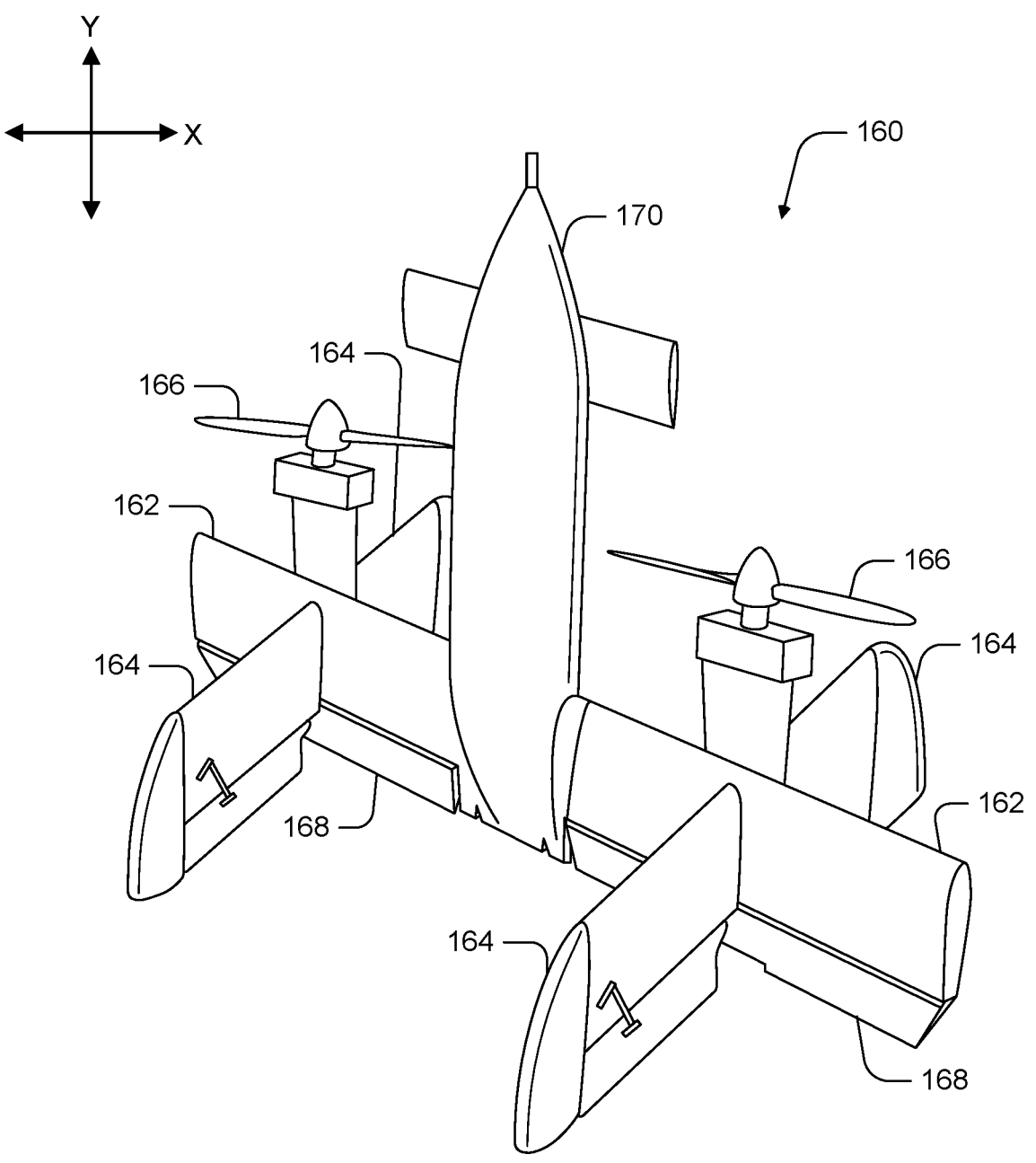
FIG. 1D is a simplified illustration of an unmanned aerial vehicle, according to example embodiments, in accordance with example embodiments.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
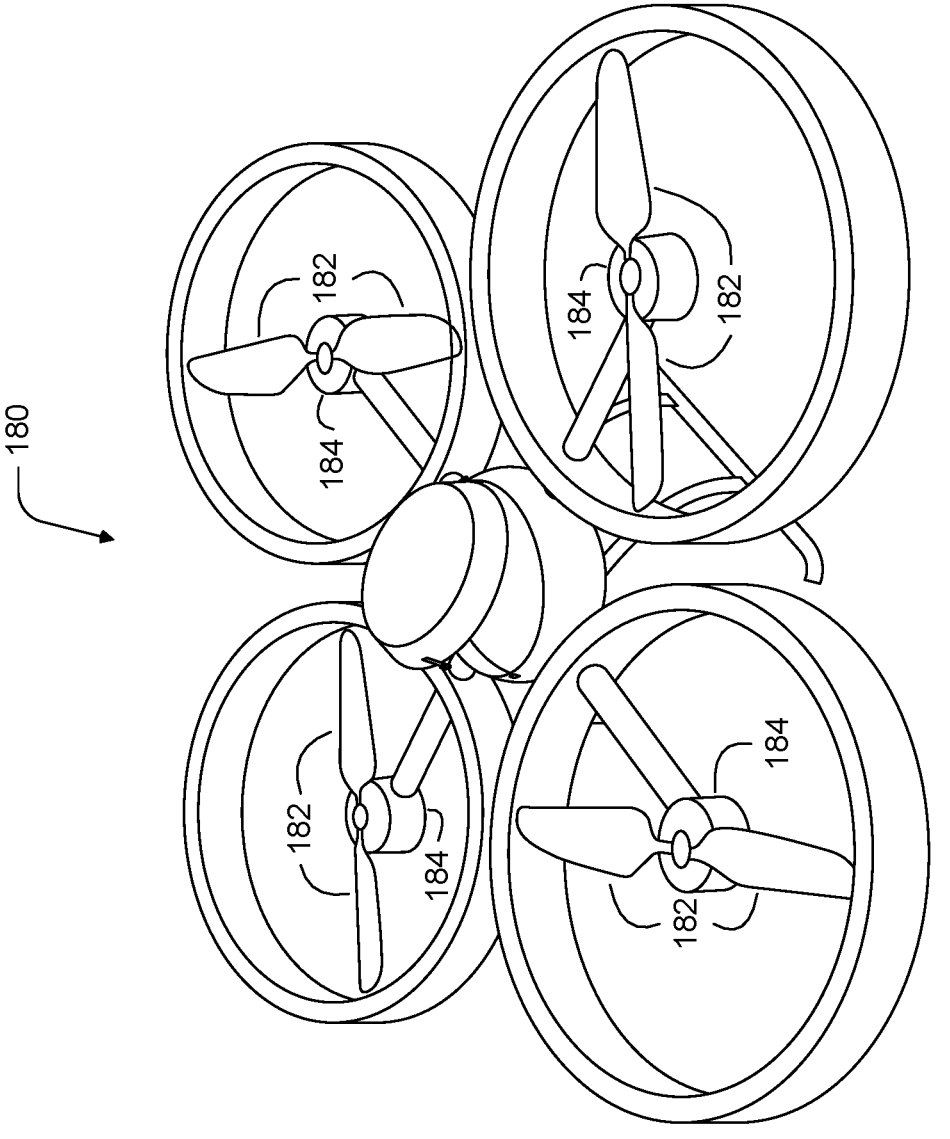
FIG. 1E is a simplified illustration of an unmanned aerial vehicle, according to example embodiments, in accordance with example embodiments.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
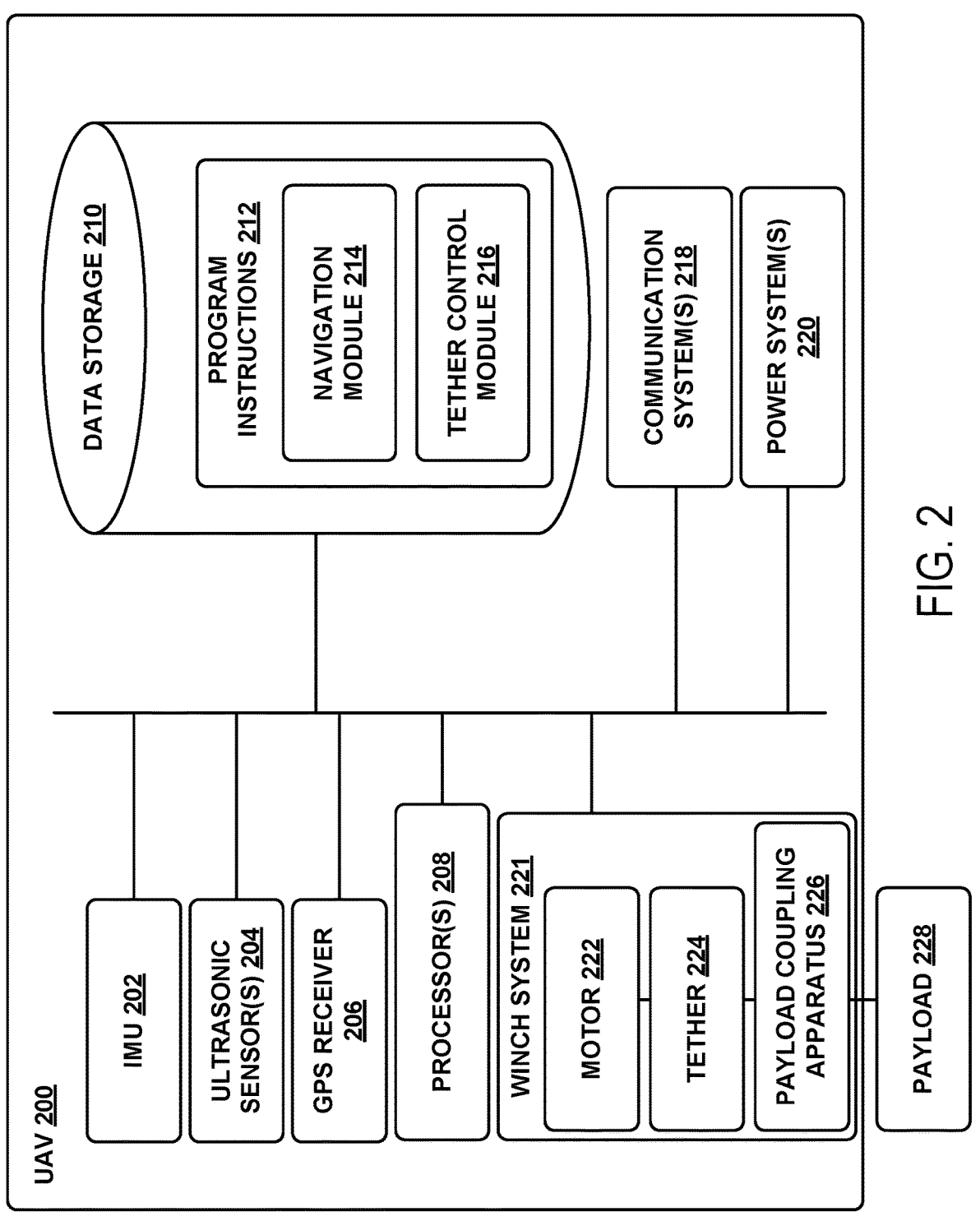
FIG. 2 is a simplified block diagram illustrating components of an unmanned aerial vehicle, in accordance with example embodiments.

FIG. 2 is a simplified block diagram illustrating components of a UAV 200, according to an example embodiment.

UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infra-red (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine latitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may include one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In some embodiments, the package may include various features that protect its contents from the environment, reduce aerodynamic drag on the system, and prevent the contents of the package from shifting during UAV flight. In other embodiments, the package may be a standard shipping package that is not specifically tailored for UAV flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload retriever 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload retriever 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operation specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload retriever 226 is pressing against the UAV 200 after retracting the tether 224. Other examples are possible as well.

During delivery of the payload 228, the payload retriever 226 can be configured to secure the payload 228 while being lowered from the UAV by the tether 224, and can be further configured to release the payload 228 upon reaching ground level. The payload retriever 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. ILLUSTRATIVE UAV DEPLOYMENT SYSTEMS

Figure 3:
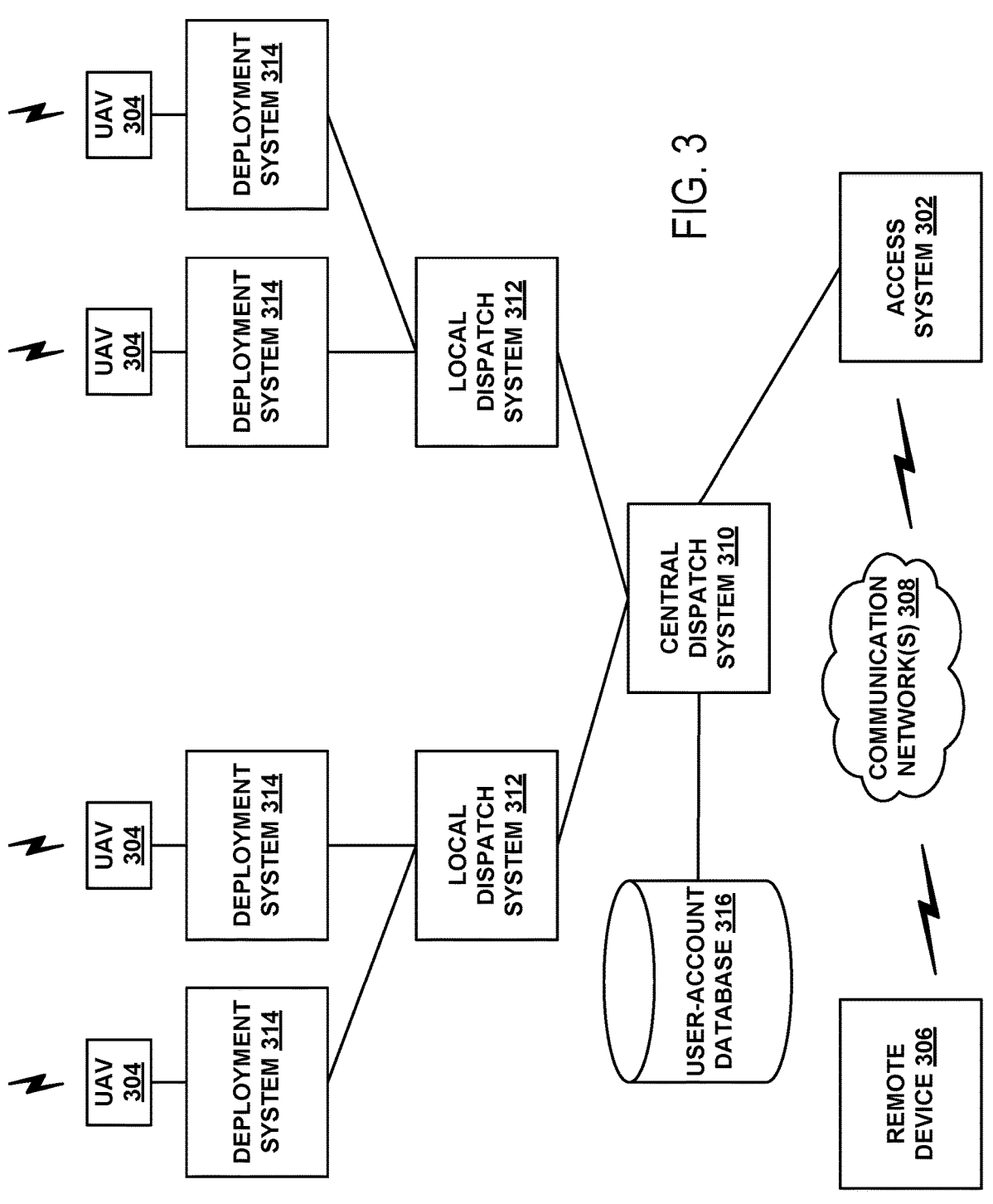
FIG. 3 is a simplified block diagram illustrating a UAV system, in accordance with example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more persons. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. MACHINE LEARNING MODELS FOR GENERATING INFERENCES/PREDICTIONS

Figure 4:
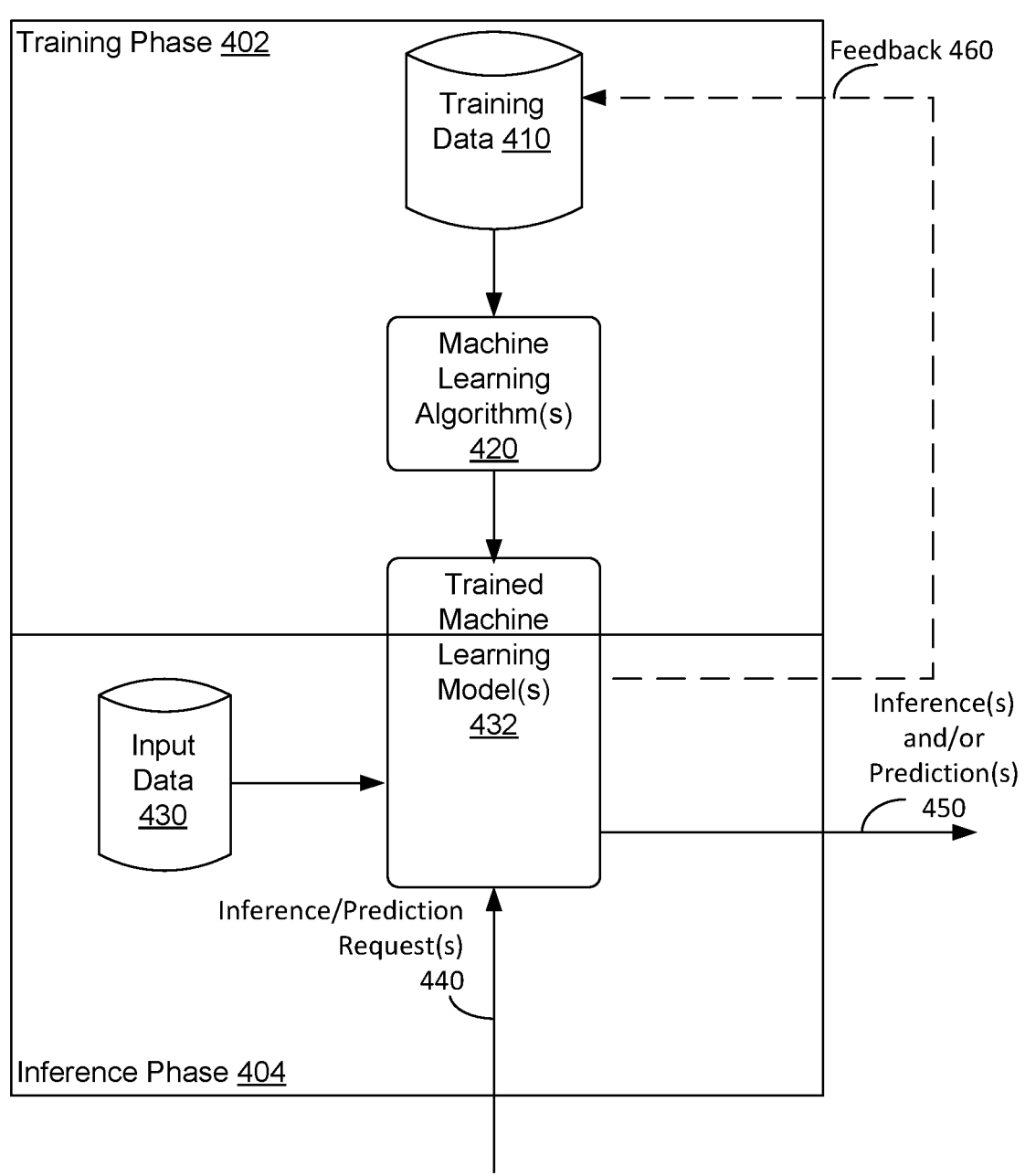
FIG. 4 is a diagram illustrating training and inference phases of a machine learning model, in accordance with example embodiments.

A UAV may be configured to use one or more machine learning models to facilitate perception, localization, navigation, and/or other UAV operations. FIG. 4 shows diagram 400 illustrating a training phase 402 and an inference phase 404 of trained machine learning model(s) 432, in accordance with example embodiments. Some machine learning techniques involve training one or more machine learning algorithms on an input set of training data to recognize patterns in the training data and provide output inferences and/or predictions about (patterns in the) training data. The resulting trained machine learning algorithm can be termed as a trained machine learning model. For example, FIG. 4 shows training phase 402 where one or more machine learning algorithms 420 are being trained on training data 410 to become trained machine learning model 432. Then, during inference phase 404, trained machine learning model 432 can receive input data 430 and one or more inference/ prediction requests 440 (perhaps as part of input data 430) and responsively provide as an output one or more inferences and/or predictions 450.

As such, trained machine learning model(s) 432 can include one or more models of one or more machine learning algorithms 420. Machine learning algorithm(s) 420 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 420 may be supervised or unsupervised, and may implement any suitable combination of online and offline learning.

In some examples, machine learning algorithm(s) 420 and/or trained machine learning model(s) 432 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 420 and/or trained machine learning model(s) 432. In some examples, trained machine learning model(s) 432 can be trained, reside, and execute to provide inferences on a particular UAV or other computing device, and/or otherwise can make inferences for the particular UAV or other computing device.

During training phase 402, machine learning algorithm(s) 420 can be trained by providing at least training data 410 as training input using unsupervised, supervised, semi-supervised, and/or reinforcement learning techniques. Unsupervised learning involves providing a portion (or all) of training data 410 to machine learning algorithm(s) 420 and machine learning algorithm(s) 420 determining one or more output inferences based on the provided portion (or all) of training data 410. Supervised learning involves providing a portion of training data 410 to machine learning algorithm(s) 420, with machine learning algorithm(s) 420 determining one or more output inferences based on the provided portion of training data 410, and the output inference(s) are either accepted or corrected based on correct results associated with training data 410. In some examples, supervised learning of machine learning algorithm(s) 420 can be governed by a set of rules and/or a set of labels for the training input, and the set of rules and/or set of labels may be used to correct inferences of machine learning algorithm(s) 420. Supervised learning of machine learning algorithm(s) 420 may include training data 410 provided by human operators and/or a trusted dataset, which may in some examples be provided by a third party.

Semi-supervised learning involves having correct results for part, but not all, of training data 410. During semi-supervised learning, supervised learning is used for a portion of training data 410 having correct results, and unsupervised learning is used for a portion of training data 410 not having correct results. Reinforcement learning involves machine learning algorithm(s) 420 receiving a reward signal regarding a prior inference, where the reward signal can be a numerical value. During reinforcement learning, machine learning algorithm(s) 420 can output an inference and receive a reward signal in response, where machine learning algorithm(s) 420 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 420 and/or trained machine learning model(s) 432 can be trained using other machine learning techniques, including but not limited to, incremental learning and curriculum learning.

In some examples, machine learning algorithm(s) 420 and/or trained machine learning model(s) 432 can use transfer learning techniques. For example, transfer learning techniques can involve trained machine learning model(s) 432 being pre-trained on one set of data and additionally trained using training data 410. More particularly, machine learning algorithm(s) 420 can be pre-trained on data from one or more computing devices and a resulting trained machine learning model provided to a UAV, where the UAV is intended to execute the trained machine learning model during inference phase 404. Then, during training phase 402, the pre-trained machine learning model can be additionally trained using training data 410, where training data 410 can be derived from the UAV. This further training of the machine learning algorithm(s) 420 and/or the pre-trained machine learning model using training data 410 of the UAV's own data can be performed using either supervised or unsupervised learning. Once machine learning algorithm(s) 420 and/or the pre-trained machine learning model has been trained on at least training data 410, training phase 402 can be completed. The trained resulting machine learning model can be utilized as at least one of trained machine learning model(s) 432.

In particular, once training phase 402 has been completed, trained machine learning model(s) 432 can be provided to a UAV, if not already on the UAV. Inference phase 404 can begin after trained machine learning model(s) 432 are provided to the UAV.

During inference phase 404, trained machine learning model(s) 432 can receive input data 430 and generate and output one or more corresponding inferences and/or predictions 450 about input data 430. As such, input data 430 can be used as an input to a trained machine learning model(s) 432 for providing corresponding inference(s) and/or prediction(s) 450 to a UAV. For example, trained machine learning model(s) 432 can generate inference(s) and/or prediction(s) 450 in response to one or more inference/prediction requests 440. Input data 430 can include data from a first UAV executing trained machine learning model(s) 432 and/or input data from one or more other UAVs.

In some examples, input data 430 can include a collection of images provided by one or more sources. The collection of images can include still images, video frames, images resident on a UAV, and/or other images. In some examples, input data 430 may include one or more two-dimensional (2D) images captured by a ground-facing camera on a UAV and representative of an environment of the UAV. The images of the environment may include, among other possibilities, a terrain beneath the UAV when the UAV is navigating from a starting location to a target location. The images of the environment may also include a delivery zone to which the UAV is tasked with delivering a payload. Other types of input data are possible as well.

Inference(s) and/or prediction(s) 450 can include output images, output intermediate images, numerical values, and/or other output data produced by trained machine learning model(s) 432 operating on input data 430 (and training data 410). In some examples, trained machine learning model(s) 432 can use output inference(s) and/or prediction(s) 450 as input feedback 460. Trained machine learning model(s) 432 can also rely on past inferences as inputs for generating new inferences.

In some examples, an output image included within inference(s) and/or prediction(s) 450 may be a semantic segmentation image, also referred to herein as a semantic image or a segmentation image. The semantic segmentation image may include semantic labels, which may also be referred to herein as semantic classifications. The semantic labels may be selected from a predetermined set of labels. In some examples, the set of labels may include labels representing buildings, roads, vegetation, vehicles, driveways, lawns, and sidewalks. In further examples, other labels may be included within a set of semantic labels as well or instead.

In further examples, an output image included within inference(s) and/or prediction(s) 450 may be a depth image. Each pixel of the depth image may represent depth, or distance of the pixel to an imaging device which captured the image. In examples where the camera is a 2D camera, the depth image generated by a machine learning model may be referred to as a monocular depth image.

Output images included within inference(s) and/or prediction(s) 450 may be used by a UAV to facilitate UAV localization, navigation, payload delivery, and/or other deployment operations. In further examples, inference(s) and/or prediction(s) 450 may include other types of output data, which may be used to facilitate the same or different UAV deployment operations as well or instead.

VI. EXAMPLE SYSTEMS AND METHODS FOR DETERMINING THE LOCATION OF THE UAV

Figure 5:
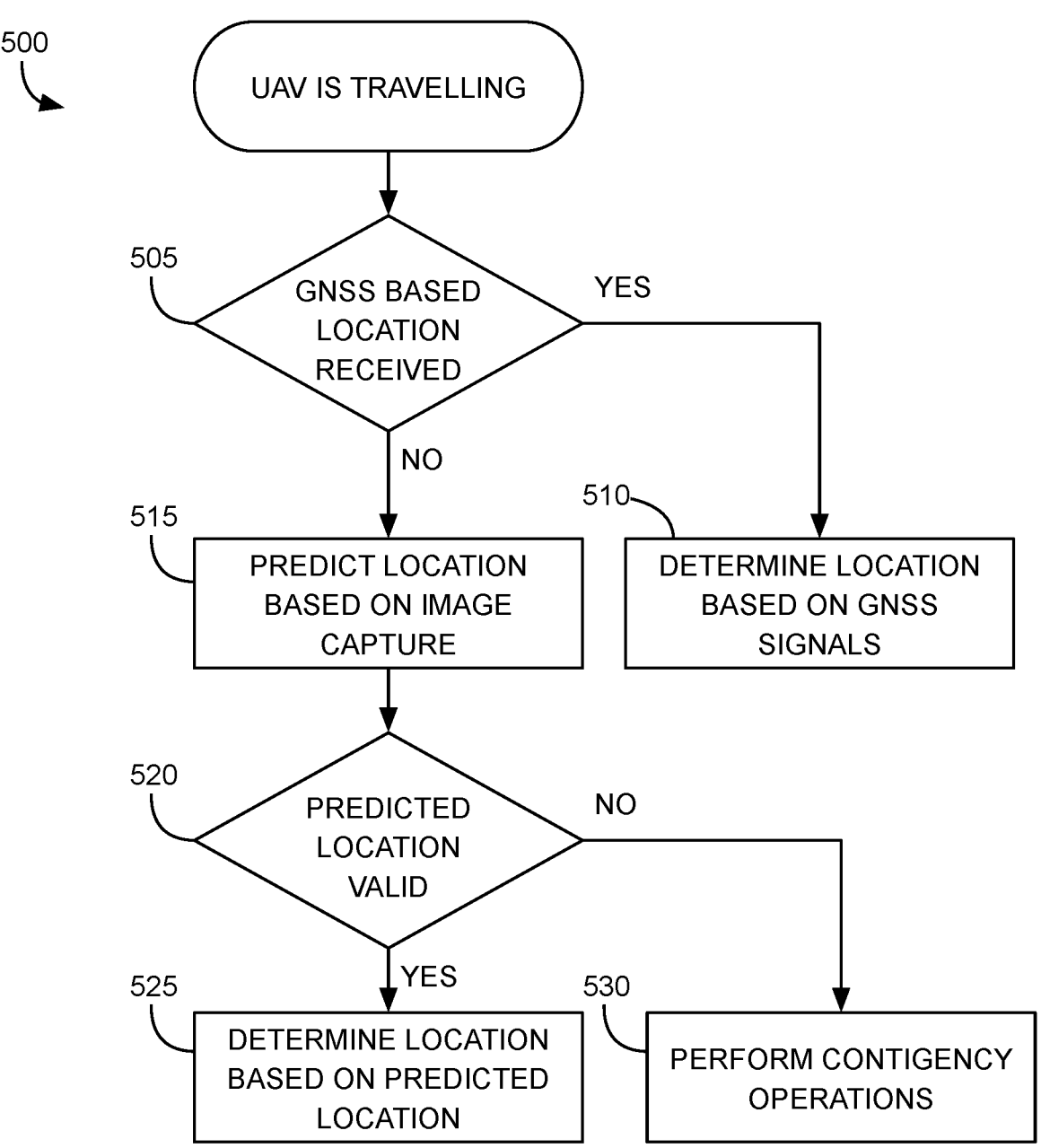
FIG. 5 illustrates operations performed by one or more devices described herein, in accordance with example embodiments.

FIG. 5 illustrates examples of operations 500 performed by some examples of the devices described above (e.g., the UAV, the deployment systems 314, local dispatch systems 312, central dispatch system 310, etc.) while the UAV is traveling (e.g., traveling to deliver a payload). In some examples, one or more of these operations are implemented via instruction code, stored in corresponding data storage of these devices. Execution of the instruction code by corresponding processors of the devices causes these devices to perform these operations 500 alone or in combination with other devices.

The operations at block 505 involve determining whether a GNSS based location has been received, for instance, from a Global Positioning System (GPS) on the UAV. In this regard, some examples of the UAV receive periodic GNSS based location updates that are based on GNSS signals received by the UAV.

If a GNSS based location has been received, the operations at block 510 are performed. These operations involve determining the location of the UAV based on the GNSS based location.

If a GNSS based location has not been received, the operations at block 515 are performed. These operations involve predicting the location of the UAV based on images captured by the UAV. These operations are described in further detail below.

The operations at block 520 involve determining whether the predicted location is valid (e.g., whether there is a high degree of confidence in the prediction). If the predicted location is valid, the operations at block 525 are performed. These operations involve determining the location of the UAV based on the predicted location. These operations are described in further detail below.

If the predicted location is invalid, the operations at block 530 are performed. These operations involve performing contingency operations. For example, some examples of the UAV are directed to hover or move in different directions for a period of time (e.g., 10 minutes) until GNSS signals are received or until an image-based location prediction can be obtained. Some examples of the UAV are directed to attempt a landing.

In some examples, one or more of the operations described above are performed when GNSS signals are available. For instance, in some examples, when GNSS signals are available, the location predicted based on the images captured by the UAV is used to refine and/or cross-check the location determined via the GNSS signals.

In some examples, the location predicted via the images and/or the location determined via the GNSS signals are communicated to a Kalman filter of a control system that controls the navigation of the UAV.

Figure 6:
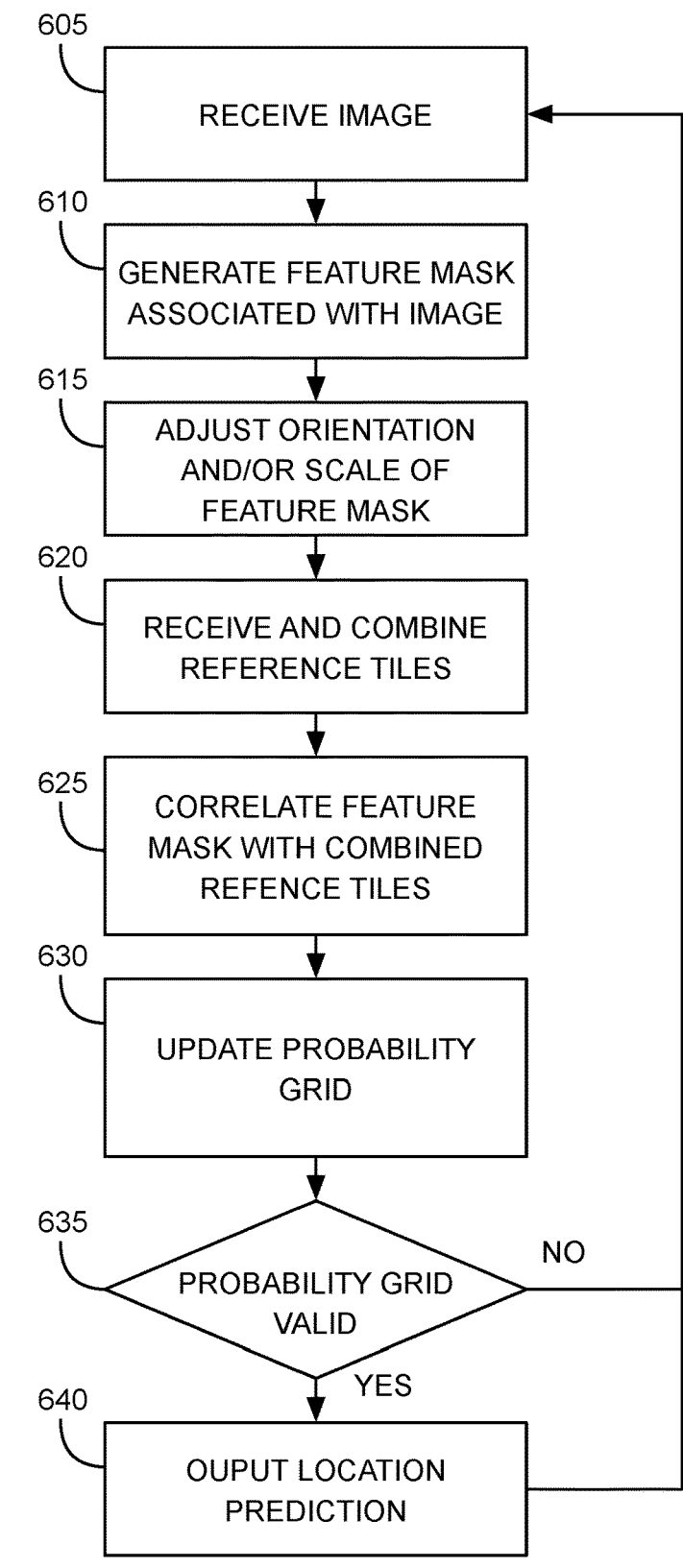
FIG. 6 illustrates operations performed by one or more devices described herein, in accordance with example embodiments.

FIG. 6 illustrates examples of operations 600 that facilitate predicting a location based on captured images. These operations are performed by some examples of the devices described above (e.g., the UAV, the deployment systems 314, local dispatch systems 312, central dispatch system 310, etc.). In some examples, one or more of these operations are implemented via instruction code, stored in corresponding data storage of these devices. Execution of the instruction code by corresponding processors of the devices causes these devices to perform these operations 600 alone or in combination with other devices. The operations 600 of FIG. 6 are more clearly understood with reference to FIGS. 7A-10B.

The operations at block 605 involve receiving an image. In some examples, the image is captured by a camera on the UAV. Some examples of the image depict surface features of the environment below the UAV. For instance, some examples of the image depict roads, structures, foliage, etc., in the area below the UAV.

Figures 7A, 7B:
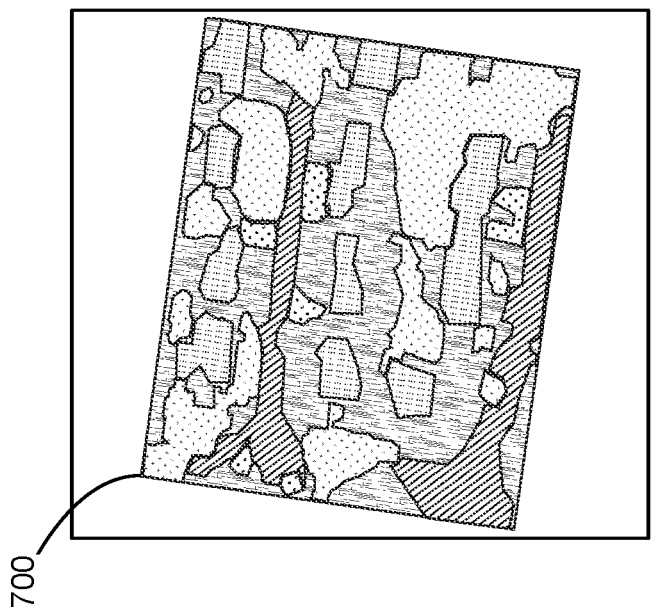
FIG. 7A illustrates a feature mask, in accordance with example embodiments.
FIG. 7B illustrates an adjusted feature mask, in accordance with example embodiments.

The operations at block 610 involve generating a feature mask 700 associated with the image. FIG. 7A illustrates an example of a feature mask 700. The feature mask 700 comprises feature outlines 705 associated with particular features depicted in the image, such as structure outlines 705A, foliage outlines 705B, road outlines 705C, driveway outlines 705D, etc. In some examples, each feature outline 705 is associated with a label that identifies the corresponding feature (e.g., structure, foliage, road, driveway, etc.). In some examples, the dimensions of the feature mask 700 (e.g., width and height in pixels) match the dimensions of the captured image.

In some examples, the feature outlines 705 associated with features depicted in the image are determined by feature detection logic. Some examples of the feature detection logic are implemented via machine learning logic described above and that is trained to identify particular features from images. In some examples, a trained machine learning model attempts to label each pixel within an image as belonging to a particular semantic class. Some examples of the UAV implement the feature detection logic (e.g., the processor and/or other subsystems of the UAV cooperate to implement the feature detection logic). In some examples, the feature detection logic is implemented by one or more ground control systems in communication with the UAV (e.g., the deployment systems 314, local dispatch systems 312, central dispatch system 310, etc.). In this regard, some examples of the UAV communicate the image captured by the UAV to a ground system, which in turn determines the feature mask 700 and communicates the feature mask 700 to the UAV.

In some examples, the feature mask is generated based at least in part on feature mask information (e.g., magnetic anomaly maps) communicated from other sources (e.g., a ground control station). In some examples, the feature mask information is derived from other sensors of the UAV or sensors of different UAVs.

The operations at block 615 involve adjusting the orientation and/or scale of the feature mask 700. FIG. 7B illustrates an example of an adjusted feature mask 700. In some examples, the features mask 700 is adjusted to match aspects of the reference tiles referred to above.

For instance, in some examples, the feature mask 700 is rotated to North-align the feature mask 700 with the reference tiles. That is, the feature mask 760 is rotated so that the heading associated with the feature mask 700 matches the heading associated with the reference tiles. In this regard, in some examples, the rotation amount may be based on the heading of the UAV (e.g., determined via the above-referenced low-power, digital 3-axis magnetometer). In some examples, headings associated with reference tiles are previously determined and associated with the reference tiles (e.g., as metadata in the reference tiles).

In some examples, the feature mask 700 is resized to match the scale associated with the reference tiles. For example, the scale of the feature mask 700 is magnified or reduced as needed so that the geographic distance associated with the distance between pixels of the feature mask 700 matches the geographic distance associated with the distance between pixels of the reference tiles. In some examples, the current scale of the feature mask 700 is determined at least in part on the altitude of the UAV, the magnification of the camera, etc.

Figures 8A, 8B:
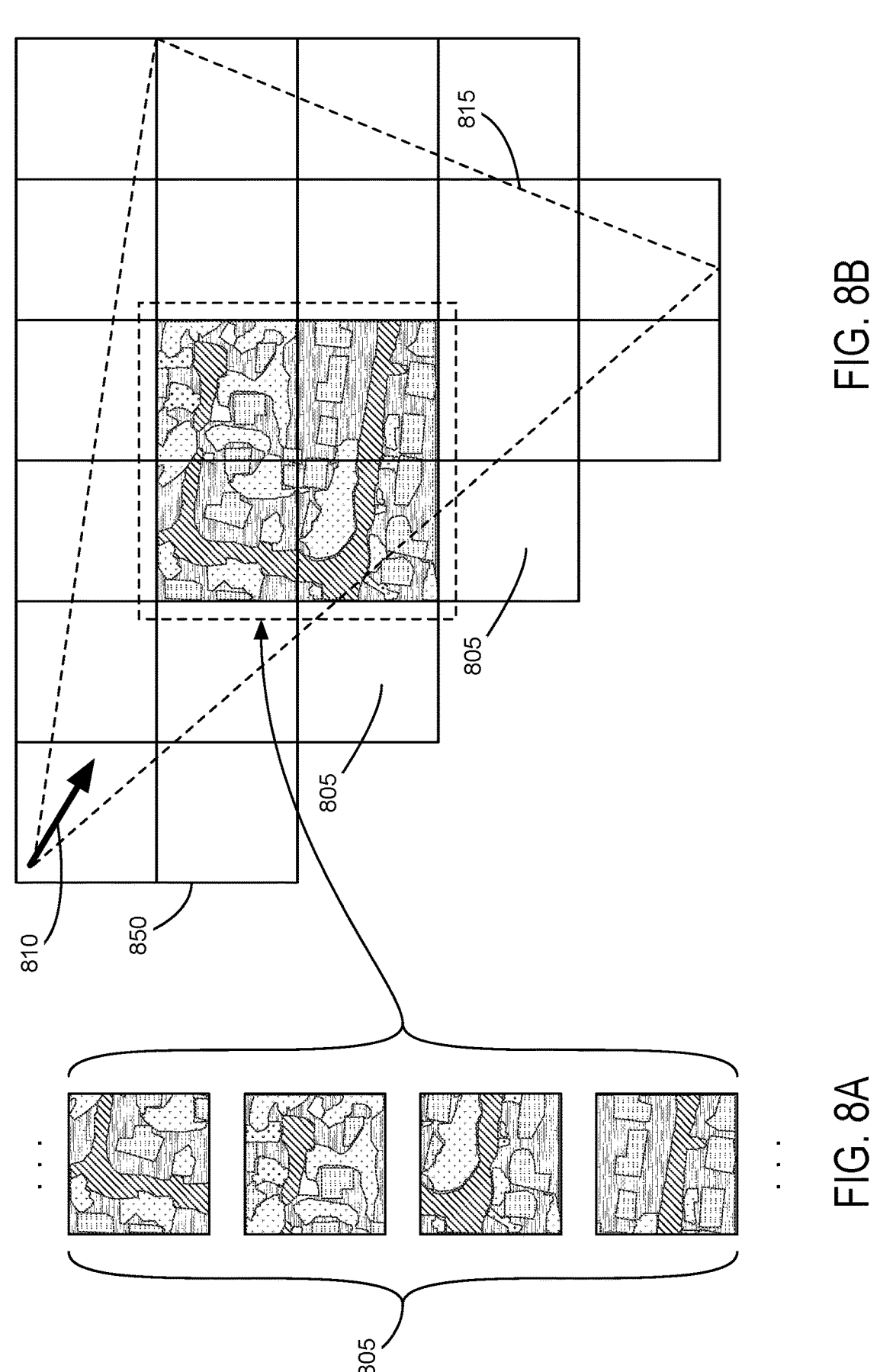
FIG. 8A illustrates received reference tiles, in accordance with example embodiments.
FIG. 8B illustrates combined reference tiles, in accordance with example embodiments.

The operations at block 620 involve receiving reference tiles 805 and combining the reference tiles 805. FIG. 8A illustrates examples of received reference tiles 805. Each reference tile 805 specifies labeled feature outlines associated with a particular geographic region (e.g., structure, foliage, road, driveway outlines, etc., located at a particular latitude and longitude). In some examples, the scales of the reference tiles 805 are previously determined and associated with the reference tiles 805 (e.g., as metadata in the reference tiles). Semantic labels of particular pixels in the reference tiles 805 may therefore be aligned with corresponding pixels of images captured by the UAV.

As illustrated in FIG. 8B, in some examples, the received reference tiles 805 are combined together. The combined reference tiles 850 form a partial representation of the features (e.g., labeled features) associated with a geographic region that is proximate to the UAV. For instance, in some examples, the geographic region defines a cone of uncertainty (CU) 815 that extends from an origin, which corresponds to the last known geographic location of the UAV, and in a direction, which corresponds to the direction of travel of the UAV. The CU 815 defines the geographic area where the UAV is most likely to be located based on its last known location and direction of travel. As noted above, in some examples, the operations of FIG. 6 are performed after GNSS communications with the UAV have been lost. In this case, in some examples, the last predicted location of the UAV corresponds to the geographic location of the UAV proximate the time when GNSS communications were lost. And the travel direction is based on the heading of the UAV (e.g., determined via the above-referenced low-power, digital 3-axis magnetometer) and/or based on the last known locations of the UAV.

Some examples of the UAV communicate information that facilitates determining the geographic region associated with the CU 815 to a ground control system that stores reference tiles 805 associated with various geographic regions. The ground control system, in turn, determines reference tiles 805 that fall within the CU 815 and communicates the reference tiles 805 to the UAV. Some examples of the UAV utilize the geographic information associated with each reference tile 805 (e.g., specified in metadata of the reference tile 805) to combine the reference tiles 805, as illustrated. Additionally, or alternatively, in some examples, the reference tiles are communicated to the UAV in advance of a flight. For instance, in some examples, the reference tiles are selected based on a planned flight path of the UAV.

Figure 9A:
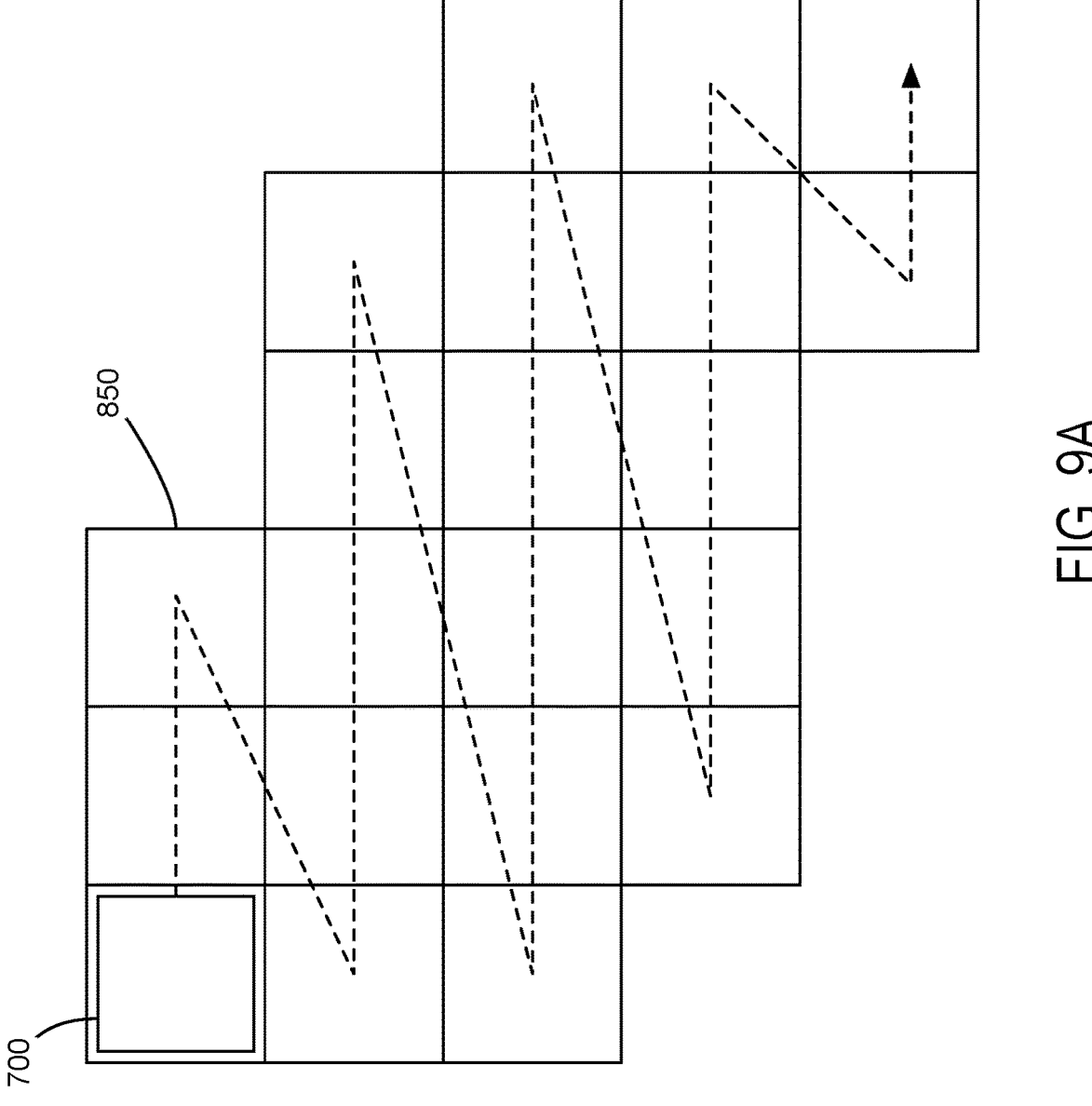
FIG. 9A illustrates the correlation of a feature mask with the combined reference tiles, in accordance with example embodiments.
Figure 9B:
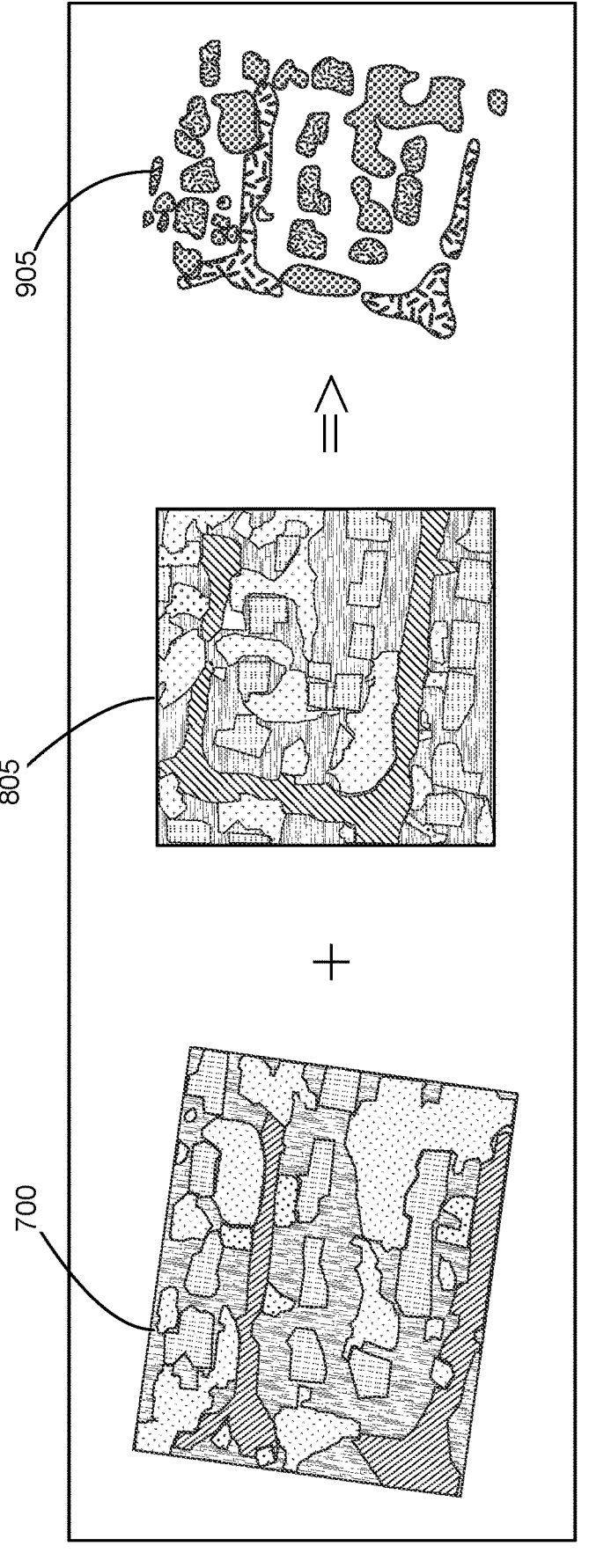
FIG. 9B illustrates the correlation of a feature mask with particular reference tiles, in accordance with example embodiments.

The operations at block 625 involve correlating the feature mask 700 with the combined reference tiles 850. In some examples, correlation involves comparing the semantic labels of pixels of the features in the feature mask 700 with the semantic labels of pixels of corresponding features specified in the combined reference tiles 850. For example, as illustrated in FIG. 9A, the feature mask 700 is moved from left to right and top to bottom on a pixel-by-pixel basis to correlate the feature mask 700 with different regions of the combined reference tiles 850. As illustrated in FIG. 9B, when the semantic labels of pixels of a particular feature of the feature mask 700 match the semantic labels of pixels of the same feature in a particular region of the combined reference tiles 850, the pixels are determined to be correlated. For example, when pixels associated with structures of the feature mask 700 match pixels associated with structures in the combined reference tiles 850, a match is determined. This aspect is illustrated by the correlation mask 905 of FIG. 9B, which shows pixels that are determined to match.

In some examples, a correlation result is determined between the feature mask 700 and each region of the combined reference tiles 850. For example, each time the feature mask 700 is moved by one pixel, a correlation result is determined. An example of the correlation result corresponds to a value indicative of the number of pixels that matched (e.g., number of pixels of the correlation mask 905 that match). For example, a value of 500 during a particular interval indicates that 500 pixels matched. In some examples, the correlation result corresponds to the percentage of pixels that match. In some examples, pixels that match are weighted according to the type of feature associated with the matching pixels. For example, pixels associated with structures that match are given a higher weight than pixels associated with foliage.

Figure 9C:
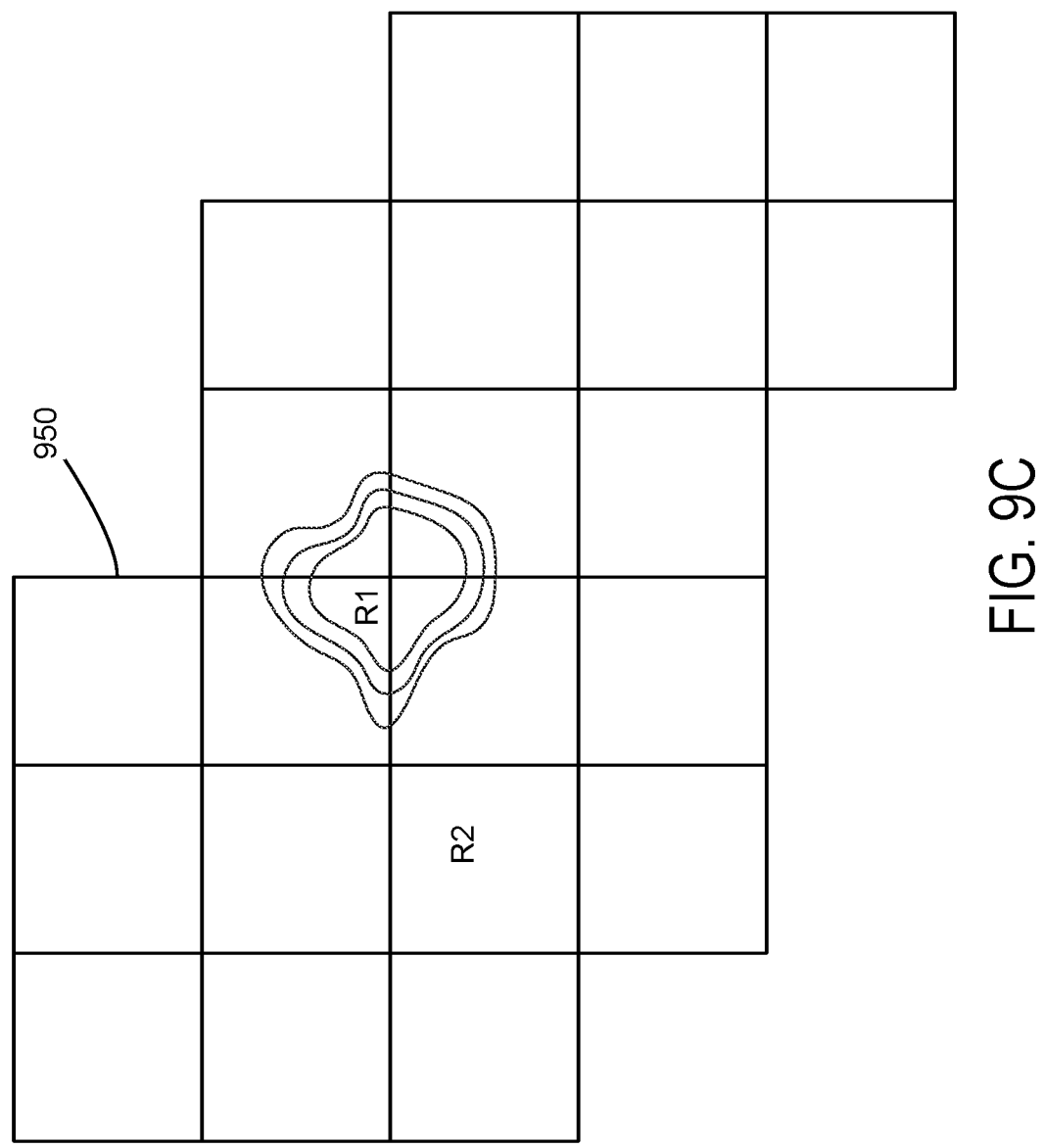
FIG. 9C illustrates a likelihood grid, in accordance with example embodiments.

In some examples, the correlation results determined above define a likelihood grid or heat map of the geographic region associated with the combined reference tiles. FIG. 9C illustrates an example of a likelihood grid 950. Regions R1 of the likelihood grid 950 having higher intensity values are considered to be more correlated with the feature mask 700 than regions R2 of the likelihood grid 950 having lower intensity values.

Figure 10A:
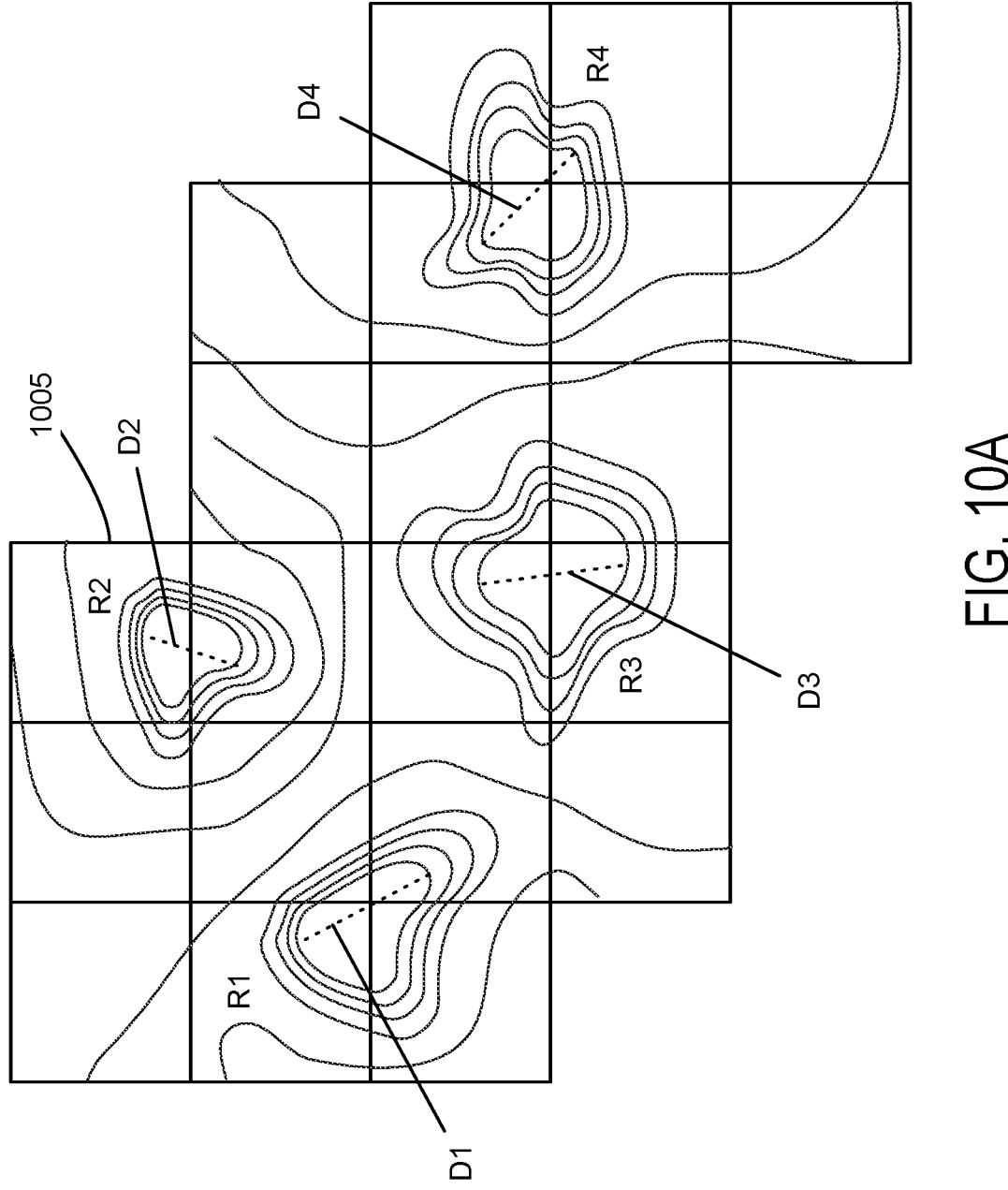
FIG. 10A illustrates a cumulative likelihood grid, in accordance with example embodiments.
Figure 10B:
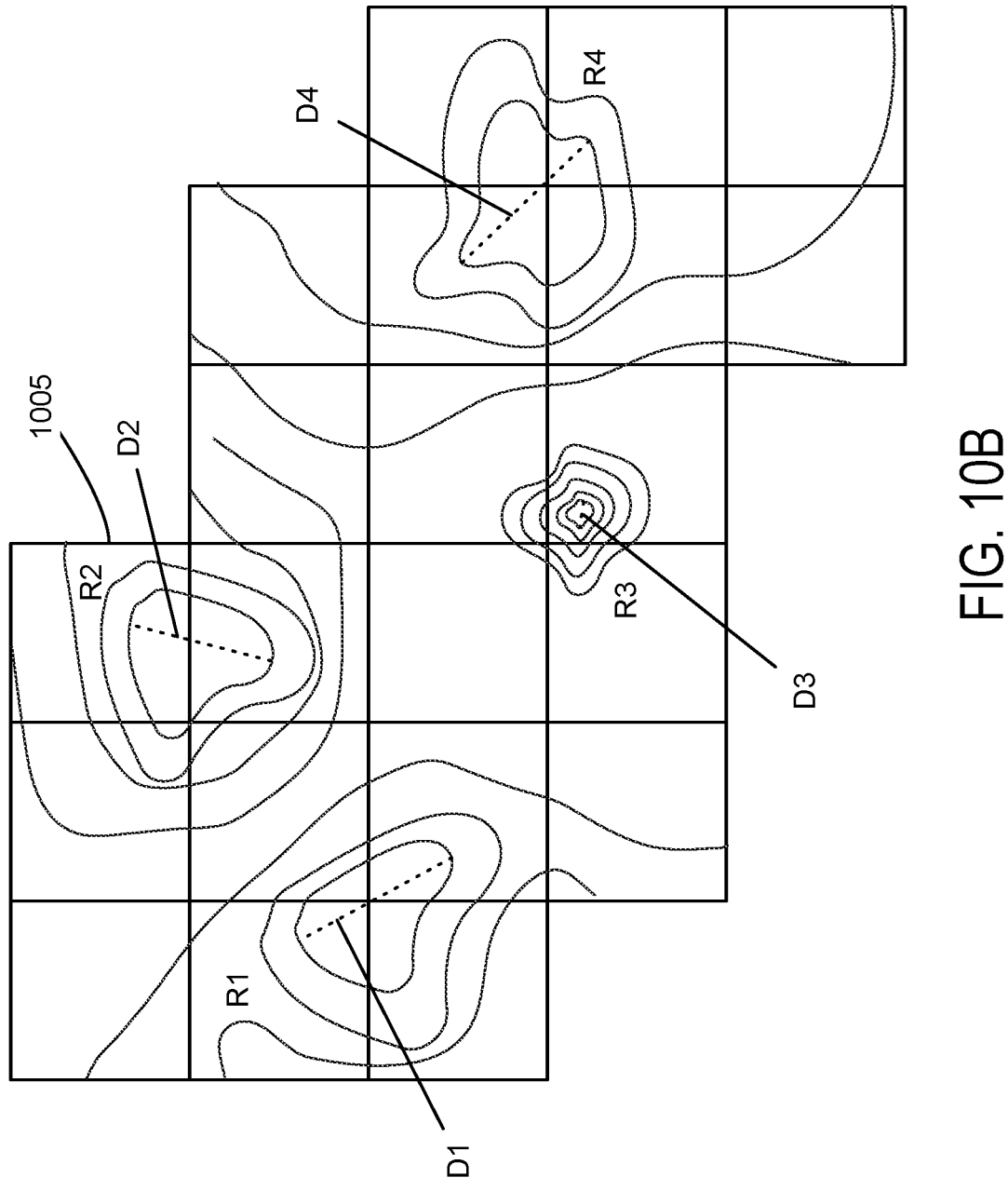
FIG. 10B illustrates a cumulative likelihood grid, in accordance with example embodiments.

The operations at block 630 involve updating a cumulative likelihood grid 1005 with the correlation results from the likelihood grid 950 determined above. FIGS. 10A and 10B illustrate examples of a cumulative likelihood grid 1005. Some examples of the cumulative likelihood grid 1005 represent the accumulated result of likelihood grids 950 determined as described above. For example, as the UAV travels and captures images, corresponding likelihood grids 950 (e.g., the heat maps that represent the correlation between particular feature masks 700 and the combined reference tiles 850) are added to the cumulative likelihood grid 1005. In this regard, some examples of the cumulative likelihood grid 1005 correspond to a heat map of the geographic region that is associated with the combined reference tiles 850. Regions of the cumulative likelihood grid 1005 having higher intensity values are considered to be more likely locations of the UAV than regions having lower intensity values.

The operations at block 635 involve determining whether the cumulative likelihood grid 1005 is valid. In an example, this determination involves determining whether a particular region of the cumulative likelihood grid 1005 includes a region that is highly probable to correspond to the location of the UAV. In this regard, in some examples, this involves determining whether the diameter associated with a particular region of the cumulative likelihood grid 1005 is below a threshold. For example, in FIG. 10A, regions R1, R2, R3, and R4 of the cumulative likelihood grid 1005 have respective diameters of D1, D2, D3, and D4. The diameters are associated with a particular probability level (e.g., a 95% probability diameter associated with a contour line indicative of 95% confidence in a position estimate). If the diameters exceed a particular validity threshold (e.g., the length of the diameters exceeds 100 pixels), then the cumulative likelihood grid 1005 is determined to not be valid. That is, the cumulative likelihood grid 1005 does not specify a region that is highly likely to correspond to the location of the UAV. Therefore, no location determination is made based on the state of the cumulative likelihood grid 1005, as illustrated in FIG. 10A and the operations continue from block 605. That is, the UAV continues to capture images and corresponding likelihood grids 950 are fused/accumulated with the cumulative likelihood grid 1005. In some examples, multiple diameters for a candidate location may be determined corresponding to different probability levels. Each such diameter may be compared to a different threshold length. For instance, in some examples, both a 25% probability diameter and a 95% probability diameter may be determined for each candidate location of the UAV.

As likelihood grids 950 are accumulated with the cumulative likelihood grid 1005, the diameters of the respective regions will diverge from one another. For example, as illustrated in FIG. 10B, the diameters D1, D2, and D4 associated with regions R1, R2, and R4 increase, and the diameter D3 associated with region R3 decreases. If the diameter associated with a particular region decreases below the validity threshold, then at block 640, the location associated with region R3 is output as the likely location of the UAV. Following the example above, if the diameter associated with region R3 falls to 100 pixels or lower, the cumulative likelihood grid 1005 is determined to be valid. The location of the UAV can then be confidently determined to correspond to the geographic location associated with region R3.

FIG. 11 illustrates examples of operations 1100 performed by some examples of the devices described above (e.g., the UAV, the deployment systems 314, local dispatch systems 312, central dispatch system 310, etc.) while the UAV is traveling (e.g., traveling to deliver a package). In some examples, one or more of these operations are implemented via instruction code, stored in corresponding data storage of these devices. Execution of the instruction code by corresponding processors of the devices causes these devices to perform these operations 500 alone or in combination with other devices.

The operations at block 1105 involve receiving an image captured by a camera on an unmanned aerial vehicle (UAV), wherein the image depicts an environment below the UAV. The operations at block 1110 involve generating a feature mask associated with the image via a machine learning model that is trained to identify and semantically label pixels representing the environment depicted in the image. The operations at block 1115 involve retrieving one or more reference tiles associated with the environment, wherein the one or more reference tiles are associated with particular geographic locations and specify semantically labeled pixels representing the geographic locations. The operations at block 1120 involve correlating the semantically labeled pixels of the feature mask with the semantically labeled pixels of at least one of the one or more reference tiles to determine the geographic location of the UAV in the environment.

Some examples of the operations involve resizing the feature mask to have a scale that matches a scale associated with the one or more reference tiles. Some examples of the operations involve aligning a heading associated with the feature mask to match a heading associated with the one or more reference tiles.

Some examples of the operations involve combining a plurality of the one or more reference tiles, and correlating the semantically labeled pixels of the feature mask with semantically labeled pixels of a portion of the combined reference tiles to determine the location of the UAV in the environment.

Some examples of the operations involve generating a likelihood grid that indicates relative likelihoods that the location of the UAV is at particular locations of the one or more reference tiles. In this regard, some examples of the operations involve generating, based on a plurality of likelihood grids associated with a corresponding plurality of images successively captured as the UAV moves through the environment, a cumulative likelihood grid that indicates relative likelihoods that the location of the UAV is at particular locations of the one or more reference tiles. When relative likelihood associated with a particular location of the one or more reference tiles exceeds a threshold likelihood, determining the geographic location of the UAV based at least in part on the particular location. Some examples of the operations involve validating the determined location of the UAV based on one or more probability diameters at one or more corresponding probability levels in the cumulative likelihood grid In some examples, aligning semantic labels of the feature mask with semantic labels of the one or more of the one or more reference tiles involves determining a correlation result between the feature mask and each reference tile by determining a total number of corresponding pixels between the feature mask and the reference tile which share a semantic label.

Some examples of the operations involve controlling the UAV to navigate in the environment based on the determined location of the UAV in the environment.

Some examples of the operations involve controlling the UAV to navigate in the environment using a Global Navigation Satellite System (GNSS) system; detecting a disruption in service from the GNSS system, wherein the geographic location of the UAV in the environment is determined responsive to detecting the disruption in service from the GNSS system; and subsequent to detecting the disruption in service from the GNSS system, controlling the UAV to navigate in the environment based on the determined location of the UAV in the environment.

Some examples of the operations involve controlling the UAV to navigate in the environment using a GNSS system and using the determined location of the UAV in the environment to cross-check location data from the GNSS system. Some examples of the operations involve determining a GNSS location of the UAV in the environment using a GNSS system; determining a refined location of the UAV in the environment based on the GNSS location of the UAV in the environment and the determined location of the UAV in the environment and controlling the UAV to navigate in the environment based on the refined location of the UAV in the environment.

Some examples of the operations involve generating a feature mask associated with the image via a machine learning model that is trained to identify and semantically label the surface features depicted in the image as corresponding to at least one of: a building, a road, vegetation, a vehicle, a driveway, a lawn, or a sidewalk.

Some examples of the operations involve retrieving the one or more reference tiles in advance of a flight of the UAV, wherein the one or more reference tiles are selected based on a planned flight path of the UAV.

Some examples of the operations involve applying a Kalman filter to the determined location of the UAV in the environment to control navigation of the UAV in the environment.

In some examples, the machine learning model has been trained based on ground truth semantic data, wherein the ground truth semantic data is based on operator labeling of images captured by one or more UAVs.

VII. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above-detailed description describes various features and functions of the disclosed systems, devices, and methods with reference to the accompanying figures. In the figures, similar symbols typically identify similar components unless context dictates otherwise. The example embodiments described herein and in the figures are not meant to be limiting. Other embodiments can be utilized, and other changes can be made without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer-readable medium such as a storage device including a disk or hard drive or other storage medium.

The computer-readable medium may also include non-transitory computer-readable media such as computer-readable media that stores data for short periods of time like register memory, processor cache, and random access memory (RAM). The computer-readable media may also include non-transitory computer-readable media that stores program code or data for longer periods of time, such as secondary or persistent long-term storage, like read-only memory (ROM), optical or magnetic disks, compact-disc read-only memory (CD-ROM), for example. The computer-readable media may also be any other volatile or non-volatile storage systems. A computer-readable medium may be considered a computer-readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A computer-implemented method comprising:
   receiving an image captured by a camera on an unmanned aerial vehicle (UAV), wherein the image depicts an environment below the UAV;
   generating a feature mask associated with the image via a machine learning model that is trained to identify and semantically label pixels representing the environment depicted in the image;
   retrieving one or more reference tiles associated with the environment, wherein the one or more reference tiles are associated with particular geographic locations and specify semantically labeled pixels representing the geographic locations; and
   correlating semantic labels of the semantically labeled pixels of the feature mask with semantic labels of the semantically labeled pixels of at least one of the one or more reference tiles to determine a geographic location of the UAV in the environment, wherein the correlating comprises:
   generating a likelihood grid that indicates relative likelihoods that the location of the UAV is at particular locations of the one or more reference tiles;
   generating, based on a plurality of likelihood grids associated with a corresponding plurality of images successively captured as the UAV moves through the environment, a cumulative likelihood grid that indicates relative likelihoods that the location of the UAV is at particular locations of the one or more reference tiles; and
   when the relative likelihood associated with a particular location of the one or more reference tiles exceeds a threshold likelihood in the cumulative likelihood grid, determining the geographic location of the UAV based at least in part on the particular location.

2. The computer-implemented method according to claim 1, wherein correlating the semantically labeled pixels of the feature mask with the semantically labeled pixels of the at least one of the one or more reference tiles comprises:

resizing the feature mask to have a scale that matches a scale associated with the one or more reference tiles.

3. The computer-implemented method according to claim 1, wherein correlating the semantically labeled pixels of the feature mask with the semantically labeled pixels of the at least one of the one or more reference tiles comprises:

aligning a heading associated with the feature mask to match a heading associated with the one or more reference tiles.

4. The computer-implemented method according to claim 1, wherein correlating the semantically labeled pixels of the feature mask with the semantically labeled pixels of the at least one of the one or more reference tiles comprises:

combining a plurality of the one or more reference tiles; and correlating the semantically labeled pixels of the feature mask with semantically labeled pixels of a portion of the combined reference tiles to determine the location of the UAV in the environment.

5. The computer-implemented method according to claim 1, further comprising validating the determined location of the UAV based on one or more probability diameters at one or more corresponding probability levels in the cumulative likelihood grid.

6. The computer-implemented method according to claim 1, further comprising controlling the UAV to navigate in the environment based on the determined location of the UAV in the environment.

7. The computer-implemented method according to claim 1, further comprising:

controlling the UAV to navigate in the environment using a Global Navigation Satellite System (GNSS) system;

detecting a disruption in service from the GNSS system, wherein the geographic location of the UAV in the environment is determined responsive to detecting the disruption in service from the GNSS system; and subsequent to detecting the disruption in service from the GNSS system, controlling the UAV to navigate in the environment based on the determined location of the UAV in the environment.

8. The computer-implemented method according to claim 1, further comprising:

controlling the UAV to navigate in the environment using a GNSS system; and using the determined location of the UAV in the environment to cross-check location data from the GNSS system.

9. The computer-implemented method according to claim 1, further comprising:

determining a GNSS location of the UAV in the environment using a GNSS system;

determining a refined location of the UAV in the environment based on the GNSS location of the UAV in the environment and the determined location of the UAV in the environment; and controlling the UAV to navigate in the environment based on the refined location of the UAV in the environment.

10. The computer-implemented method according to claim 1, wherein generating the feature mask associated with the image via the machine learning model that is trained to identify and semantically label the pixels representing the environment depicted in the image comprises:

generating a feature mask associated with the image via a machine learning model that is trained to identify and semantically label the pixels representing the environment depicted in the image as corresponding to at least one of: a building, a road, vegetation, a vehicle, a driveway, a lawn, or a sidewalk.

11. The computer-implemented method according to claim 1, further comprising retrieving the one or more reference tiles in advance of a flight of the UAV, wherein the one or more reference tiles are selected based on a planned flight path of the UAV.

12. The computer-implemented method according to claim 1, further comprising applying a Kalman filter to the determined location of the UAV in the environment to control navigation of the UAV in the environment.

13. The computer-implemented method according to claim 1, wherein the machine learning model has been trained based on ground truth semantic data, wherein the ground truth semantic data is based on operator labeling of images captured by one or more UAVs.

14. An unmanned aerial vehicle (UAV), comprising:

a camera; and a control system configured to perform operations comprising:

receiving an image captured by the camera, wherein the image depicts an environment below the UAV;

generating a feature mask associated with the image via a machine learning model that is trained to identify and semantically label pixels representing the environment depicted in the image;

retrieving one or more reference tiles associated with the environment, wherein the one or more reference tiles are associated with particular geographic locations and specify semantically labeled pixels representing the geographic locations; and correlating semantic labels of the semantically labeled pixels of the feature mask with semantic labels of the semantically labeled pixels of at least one of the one or more reference tiles to determine a geographic location of the UAV in the environment, wherein the correlating comprises:

generating a likelihood grid that indicates relative likelihoods that the location of the UAV is at particular locations of the one or more reference tiles;

generating, based on a plurality of likelihood grids associated with a corresponding plurality of images successively captured as the UAV moves through the environment, a cumulative likelihood grid that indicates relative likelihoods that the location of the UAV is at particular locations of the one or more reference tiles; and when the relative likelihood associated with a particular location of the one or more reference tiles exceeds a threshold likelihood in the cumulative likelihood grid, determining the geographic location of the UAV based at least in part on the particular location.

15. The UAV according to claim 14, wherein correlating the semantically labeled pixels of the feature mask with the semantically labeled pixels of the at least one of the one or more reference tiles comprises:

combining a plurality of the one or more reference tiles; and aligning the semantic labels of the feature mask with a portion of the combined reference tiles to determine the location of the UAV in the environment.

16. The UAV according to claim 15, wherein correlating the semantically labeled pixels of the feature mask with the semantically labeled pixels of the at least one of the one or more reference tiles comprises:

generating a likelihood grid that indicates relative likelihoods that the location of the UAV is at particular locations of the one or more reference tiles.

17. A non-transitory computer readable medium comprising program instructions executable by one or more processors to perform operations, the operations comprising:

receiving an image captured by the camera, wherein the image depicts an environment below the UAV;

generating a feature mask associated with the image via a machine learning model that is trained to identify and semantically label pixels representing the environment depicted in the image;

retrieving one or more reference tiles associated with the environment, wherein the one or more reference tiles are associated with particular geographic locations and specify semantically labeled pixels representing the geographic locations; and correlating semantic labels of the semantically labeled pixels of the feature mask with semantic labels of the semantically labeled pixels of at least one of the one or more reference tiles to determine a geographic location of the UAV in the environment, wherein the correlating comprises:

generating a likelihood grid that indicates relative likelihoods that the location of the UAV is at particular locations of the one or more reference tiles;

generating, based on a plurality of likelihood grids associated with a corresponding plurality of images successively captured as the UAV moves through the environment, a cumulative likelihood grid that indicates relative likelihoods that the location of the UAV is at particular locations of the one or more reference tiles; and when the relative likelihood associated with a particular location of the one or more reference tiles exceeds a threshold likelihood in the cumulative likelihood grid, determining the geographic location of the UAV based at least in part on the particular location.

* * * * *